Aug. 31, 1965
G. T. RANDOL
3,203,187
DUAL-CYLINDER HYDRAULIC ACTUATOR FOR
AUTOMOTIVE CLUTCH AND BRAKE CONTROL
Filed April 29, 1963
5 Sheets-Sheet 1
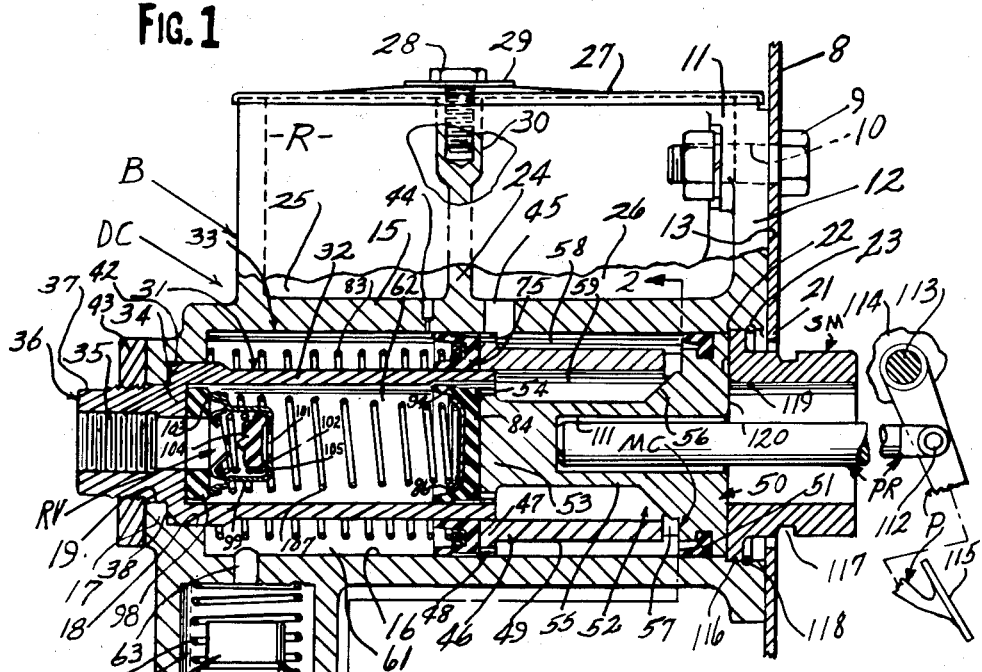
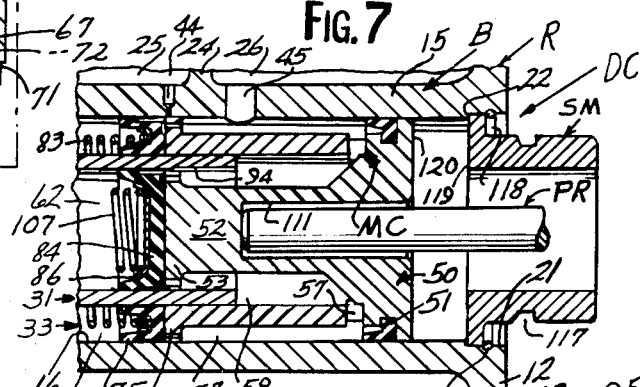
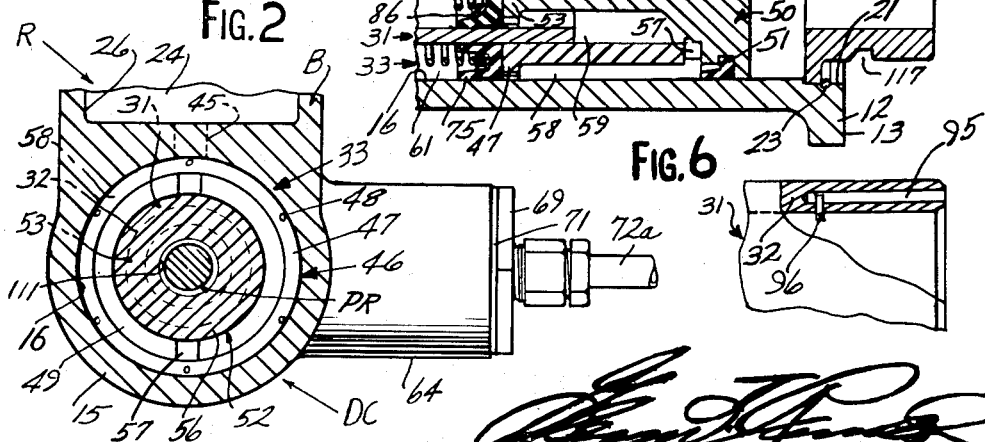
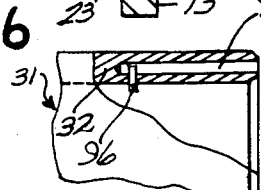
Inventor

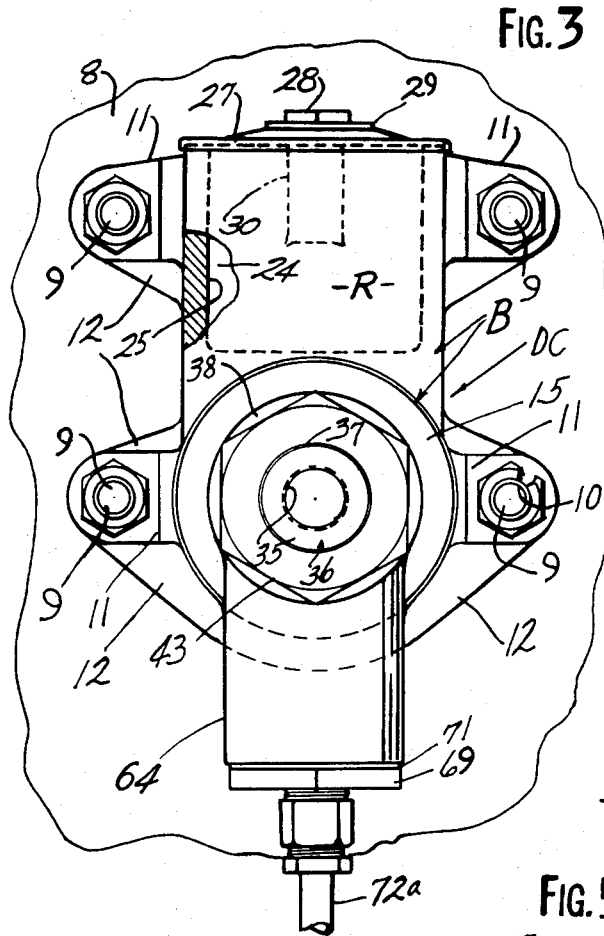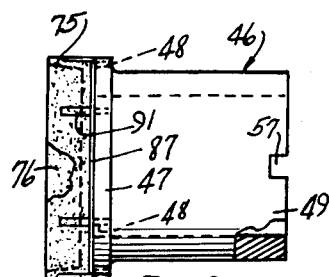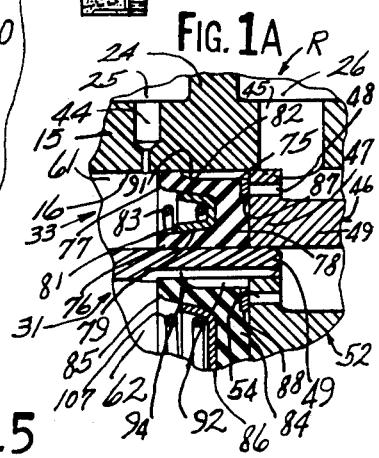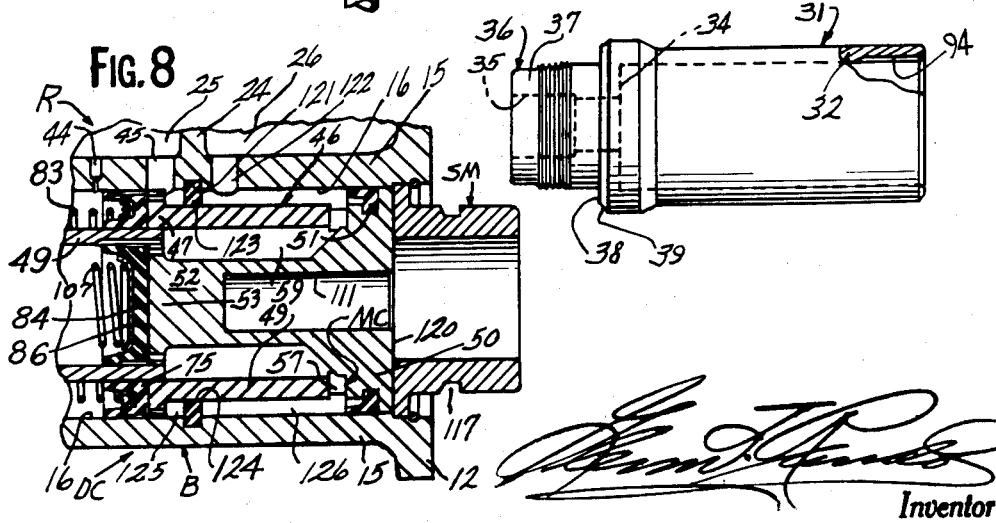

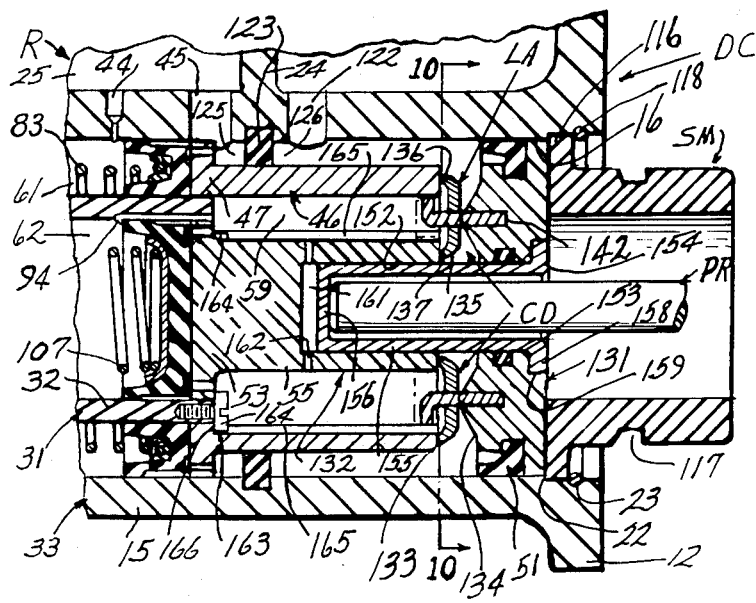

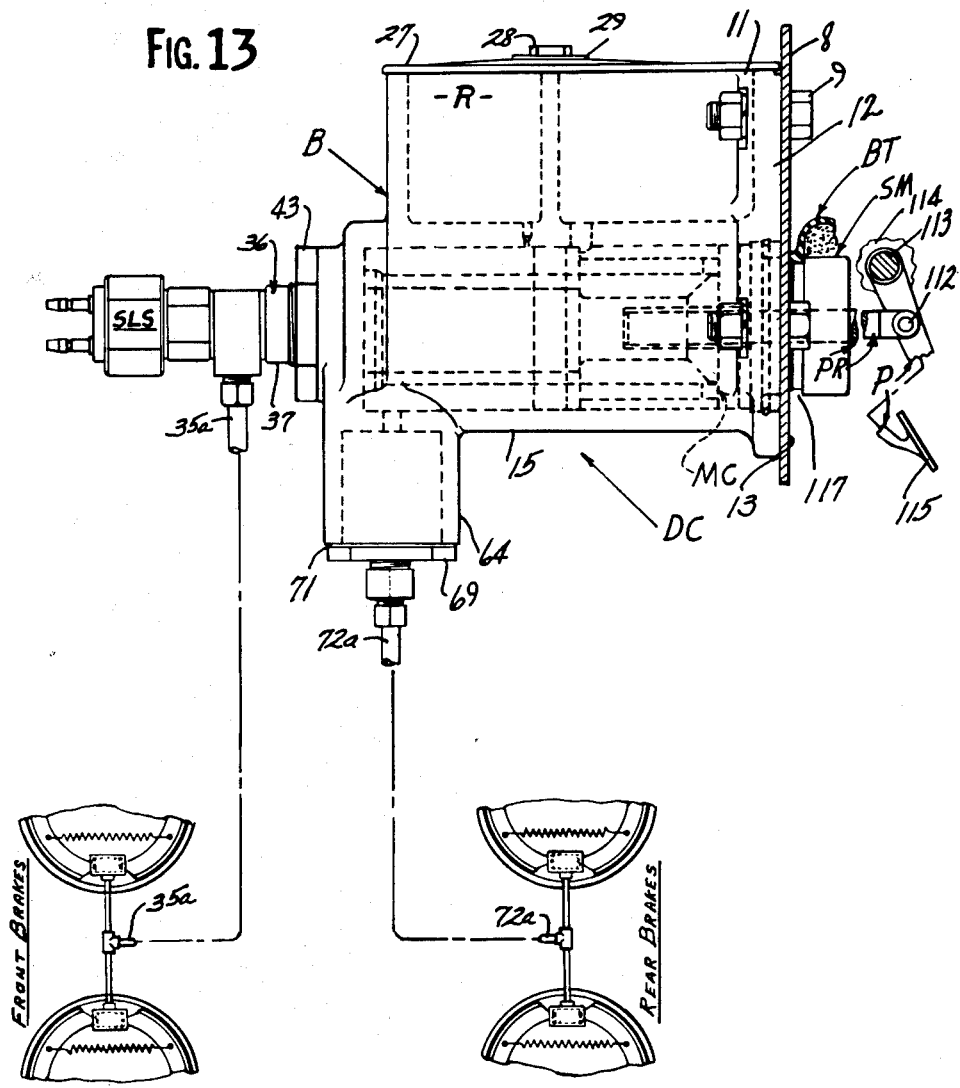

Inventor

United States Patent Office 3,203,187
Patented Aug. 31, 1965

3,203,187
DUAL-CYLINDER HYDRAULIC ACTUATOR FOR
AUTOMOTIVE CLUTCH AND BRAKE CONTROL
Glenn T. Randol, 3 E. 2nd Ave., Loch Lynn,
Mountain Lake Park, Md.
Filed Apr. 29, 1963, Ser. No. 276,634
26 Claims. (Cl. 60—54.6)

My invention relates generally to fluid pressure systems incorporating a dual-cylinder hydraulic actuator, the invention having particular reference to a novel and improved design dual master cylinder for actuating automotive front and rear wheel service brakes respectively, or to actuate such brakes by one of the cylinders and the main torque-transmitting friction clutch by the other cylinder to facilitate controlling the associated manual-shift transmission, and starting the vehicle.

The primary object of my invention is the provision of a new and improved dual-displacement master cylinder which is characterized by lower manufacturing cost than the designs other workers in the art have provided as well as being more compact and operationally efficient as a result of an improved overlapping arrangement of the cylinders and novel mechanical means operable to compensate for fluid demand differential of the systems activated by pressurized fluid from the displacement chambers in the cylinders.

An object importantly related to the foregoing primary aim of my invention, is to produce such a dual-piston master cylinder with their respective fluid-displacing pistons processed to control fluid movement from the reservoir side to the pressure-working side thereof via a common intake port and a plurality of circumferentially spaced passages incorporated in the piston heads which communicate with a like-number of surface flutes in their respective seals of commercial design, thus enabling the well known "feathering" application of the brakes, and "pumping" of the brake-pedal to prevent loss-of-pedal therefore braking force in consequence of "fade" due to overheating, in the same manner as provided by the conventional master cylinder.

A further important but more specific object relates to the aforementioned novel mechanical compensating means which interconnect the said dual-pistons with a common piston-like actuator acted on by the brake-pedal, and wherein said compensating means enable unitary movement of the pistons under conditions of substantially equal fluid displacement requirements by each into its respective brake system, therefore under such conditions each piston would move substantially the same distance into its cooperating displacement chamber. If, however, the fluid requirements of one brake system exceeds that of the other brake system, said compensating means would function to enable the piston serving the one system to move further into its displacement chamber relatively to the other piston while maintaining the latter piston effective against the non-compressible column of fluid in the other system, to automatically compensate by a quantity of fluid to meet the requirement of the one system so that both systems would be set up equally solid to apply the brakes.

Another salient feature is to so construct a master cylinder of the type under consideration that the residual pressure check valves are interchangeable with those used in the conventional master cylinder, and the return spring, spring seat and associated cup seal of one of the cylinders are also interchangeable with similar components of the conventional master cylinder, thus lowering the cost and facilitating service operations when needed by the availability of such stock items.

A further salient feature of my improved dual-piston master cylinder resides in the novel arrangement of the two coaxial pistons such that the inner piston acted on by the brake-pedal, is adapted to engage the outer piston to move as a unit therewith in a pressurizing direction, so that loss-of-pedal cannot occur when one of the pistons becomes inoperative as by rupture of the connected brake line. Pedal operating height is not affected when either one of the cylinders becomes inoperative. Loss-of-pedal can only occur when both cylinders become inoperative.

More specifically, the present master cylinder is provided with a body of substantially conventional design having a gravity-type supply reservoir, and a pair of coaxial cylinders in telescopic overlapping relation which communicate with separate compartments in said reservoir via a pair of compensating ports incorporated in the walls of their respective cylinders, with both cylinders being in continuous communication with one of the reservoir compartments via a common intake port incorporated in the wall of the outer cylinder.

An object related to the object next preceding, is to provide such a master cylinder with a pair of intake ports in the outer cylinder whereby each compartment of the reservoir communicates only with its associated compensating and intake ports, that is, each cylinder is provided with a compensating port and an intake port separate from similar ports which serve the other cylinder so that fluid control operation of the dual-cylinders is effected independently yet the cylinders are arranged in coaxial overlapping relationship for simultaneous actuation to pressurize the fluid in their respective working chambers.

A further more specific feature of my invention is the novel arrangement of an inner cylinder detachably mounted within the outer cylinder to provide an annular outer cylinder, said inner cylinder having means for stabilizing it in coaxial relationship with respect to the outer cylinder, and a fluid discharge passage incorporated in said stabilizing means, with the outer cylinder having a separate discharge passage, said passages being adapted to convey pressurized fluid from the working chambers of said cylinders to their respective brake lines to operate the vehicle brakes.

This dual-piston unit is constructed with the same mounting flange and bolt hole spacing as the conventional master cylinder so that it can be installed in the same space in which the conventional unit is mounted on the firewall in the engine compartment, and also can utilize the same pedal push-rod and stoplight switch for easy replacement of the conventional master cylinder, thus providing an important "safety" advance by having separate hydraulic circuits to the front and rear brakes.

With these and other objects and advantages in view which will become apparent in the course of the following description, as set forth in the claims and illustrated by means of certain embodiments in the accompanying drawing, wherein:

FIGURE 1 is a longitudinal vertical section of a master cylinder embodying my invention for operation from the conventional suspended brake-pedal, with the parts in their respective fully retracted positions corresponding to brakes "off" condition;

FIGURE 1A is a fragmentary view on an enlarged scale of FIGURE 1 to show the details of the dual compensating passages and common intake port for the dual-cylinders;

FIGURE 2 is a transverse section taken along the line 2—2 of FIGURE 1 to show particulars of the slotted end of the outer sleeve-type piston with the lateral boss for the brake line connection projecting horizontally from the side of the master cylinder body;

FIGURE 3 is a front elevation showing the two outlet connections to the front and rear brake lines;

FIGURE 4 illustrates the outer annular piston per se;

FIGURE 5 illustrates the inner cylinder per se;

FIGURE 6 illustrates a modified compensating passageway for the inner cylinder;

FIGURE 7 is a fragmentary view of FIGURE 1 showing the protracted fluid pressurizing disposition of the dual-pistons corresponding to brakes "on" condition;

FIGURE 8 is another modified form of the invention wherein the dual-cylinders are provided with separate intake ports as well as separate compensating ports to provide independent fluid control operations of the cylinders;

FIGURE 9 is another modified form of the invention wherein the dual-pistons and a fluid-retaining piston-like actuator are interconnected by a plurality of radially interpositioned levers to produce novel mechanical compensating means providing limited relative movement of said pistons to effect fluid compensation therebetween;

FIGURE 10 is a transverse section taken along the line 10—10 of FIGURE 9 to show particulars of the radial levers pivotally mounted intermediately on fulcrum elements projecting from the face of said actuator;

FIGURE 11 is a fragmentary view of FIGURE 9 showing the pistons and levers in relative fluid compensating positions wherein the outer piston has been moved relatively to the inner piston to stabilize both pistons;

FIGURE 12 is a perspective view of one of the radial levers and associated fulcrum element;

FIGURE 13 is a schematic representation of a dual hydraulic brake system incorporating my improved dual master cylinder for actuating the front and rear wheel service brakes through independent brake lines;

Figure 14:
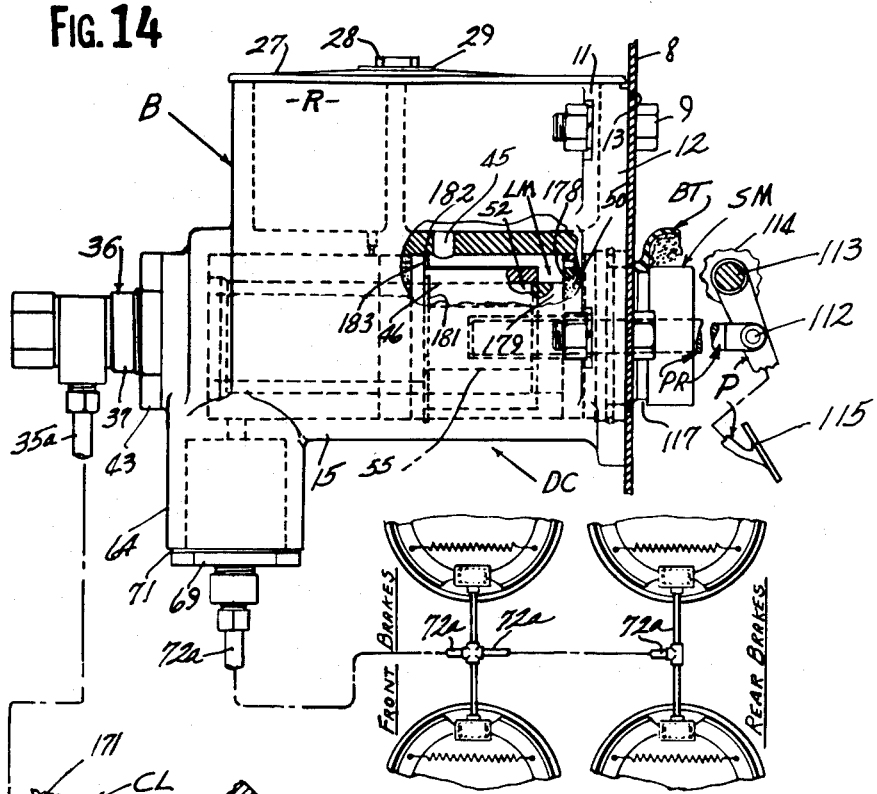
Figure 15:
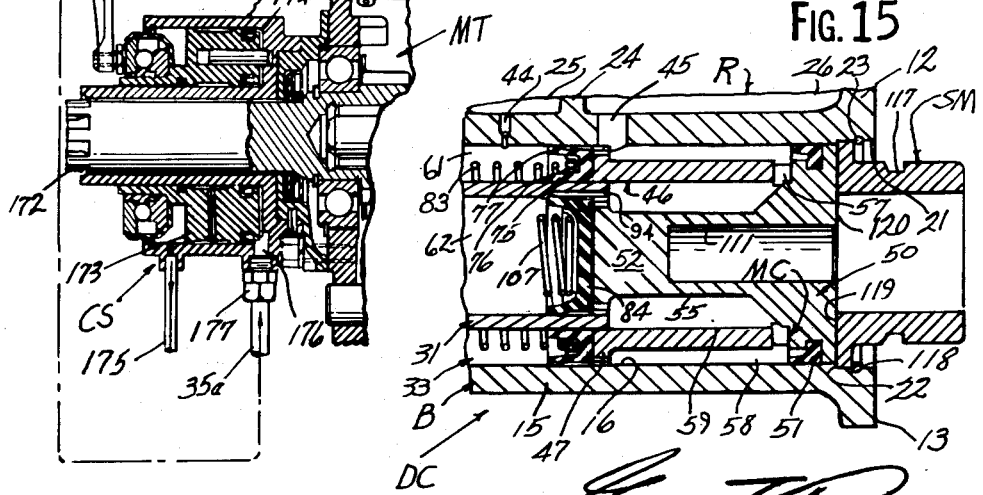

FIGURE 14 is another schematic representation of an optional application of my dual master cylinder for actuating the front and rear wheel service brakes by one of the cylinders, and for operating the conventional master friction clutch interposed in the drive line of a motor vehicle between the engine and a manual-shift change speed transmission by the other cylinder, with both cylinders activatable in the sequence of declutching and braking; and FIGURE 15 is another modified form of the invention adapted to effect clutch-disengagement and brake-application in the same sequence of FIGURE 14 by spacing the compensating port for the brake-actuating cylinder ahead of its cooperating piston when the latter is fully retracted to delay operativeness of said cylinder until the clutch-disengaging cylinder has effected clutch-disengagement.

Like characters of reference in the several views designate like parts.

Referring now to the drawing, and particularly to FIGURES 1, 1A and 2, I have used with the reference character DC to designate my novel and improved dual-piston master cylinder as a whole, and the body thereof is designated by the reference character B which is adapted, for example, to be mounted in operating position on the engine side of the vehicle firewall panel 8 by the usual means of a plurality of bolts 9 projecting through a like-number of holes 10 in marginal projections 11 integral with the rear flanged wall 12 of said body, said wall and projections having a smooth face 13 contiguous to said firewall as shown in FIGURE 1.

The body B comprises an elongated cylindrical wall 15 which is processed with a bore 16 defined by a working surface substantially coextensive therewith and having one end open and the opposite end closed as by means of an integral wall 17 or otherwise. The inner side of the end wall 17 is formed with a circular recess 18 coaxial with said bore, and merges with a central opening 19 extending to the exterior of said wall as shown in FIGURE 1. The open end of said bore terminates in a counterbored portion 21 to produce therewith an internal annular shoulder 22, and spaced from said shoulder is an internal annular groove 23 indented in the surface defining said counterbore. A fluid supply reservoir R is formed with an open top as an integral part of said wall 15 for gravitational feed into the bore 16. An integral partition wall 24 serves to divide the interior of said reservoir into front and rear compartments 25, 26 respectively. The open top of said reservoir is closed by means of a removable cover 27 of rectangular configuration and having its perimeter downwardly flanged for stiffness and positioning over the open top of the reservoir. A cap screw 28 projects through a washer 29 and a central coaxial opening defining the peak of an embossed portion on said cover, into threaded engagement with a complementally threaded boss 30 integral with the upper medial portion of said partition wall to stabilize the cover in fluid-tight position over the open top of said reservoir. Thus, the cap screw enables release of the cover so that it can be turned to one side to uncover portions of the open tops of the said reservoir compartments for refilling as needed. The embossed portion of the cover provides for space between the upper end of the partition wall, therefore serves to maintain both reservoir compartments in communication with each other so that filling of one compartment will as a consequence of overflow, fill the other compartment.

Coaxially disposed substantially the forward half of said bore 16 is an elongated tubular member (sleeve) 31 which serves as a cylinder for one of the brake lines, and will hereinafter be referred to as the "inner cylinder." The wall 32 of this cylinder is circularly spaced from the working surface of the bore 16 to provide an annular space therebetween which defines an outer annular cylinder 33 for the other brake line. The forward end of the inner cylinder 31 is closed by an integral wall 34 which is centrally bored to provide a discharge passage 35 for said cylinder, the outer portion of said passage being threaded for reception of the threaded stem of the conventional pressure-operated stoplight switch generally designated SLS (see FIGURE 13), which locks the interposed commercial hydraulic fitting in position for conveying pressurized fluid from said inner cylinder to the connected brake line 35a. Projecting integrally from the outer side of the end wall 34 is a reduced externally threaded coaxial extension 36 which has a smooth terminating portion 37. An external annular shoulder 38 defines the juncture of the extension 36 and wall 34 of the inner cylinder with the outer corner of said shoulder being annularly beveled at 39 to provide an annular space of triangular cross section for reception of a commercial O-ring 42 so that when the shoulder 38 is impinged against the marginal face of the recess 18 as shown in FIGURE 1, a fluid-tight seal obtains between the closed ends of the master cylinder body B and inner cylinder 31. An enlarged hex lock-nut 43 threaded on the threaded portion of the extension 36 draws the inner cylinder 31 into sealed engagement with the marginal portion of the recess 18 by subjecting said O-ring to compression, and thereby stabilizes said inner cylinder in coaxial relationship with respect to the bore 16.

The walled enclosure of the bore 16 is provided with a compensating port 44 which normally interconnects the front compartment of the reservoir R with that portion of the bore 16 which defines the outer annular cylinder 33, and spaced from said compensating port on the opposite side of the reservoir partition 24 is an intake port 45 through the wall 15 of said bore 16 for maintaining fluid communication between the rear compartment 26 of the reservoir R and the interior of said bore.

Operably disposed in the annular space defining the outer cylinder 33 is a complemental annular piston 46 processed with a forward annular head land 47 having a plurality of longitudinal fluid passages 48 through the peripheral portion thereof, and a reduced diameter elongated tubular portion 49 extending rearwardly into engagement with the forward confronting face portion on an enlarged diameter fluid-retaining actuator disclosed herein as an annular piston or land 50 provided with an annularly grooved cylindrical offset portion, said groove being fitted with a single-lip fluid-retaining seal 51 as shown. The aforesaid engagement of the tubular portion 49 with the fluid-retaining piston 50 produces what may be termed a "one-way mechanical connection" generally designated "MC" between said piston 46 and an inner spool-type piston unit 52, to enable unitary movement of both pistons in a fluid-pressurizing direction. The inner spool-type piston 52 comprises the fluid-retaining land 50 axially spaced from a reduced diameter circular head land 53 processed with a plurality of longitudinal fluid passages 54 through its peripheral marginal portion, and a cylindrical piston-carrying element 55 interconnecting pistons 50, 52 as shown. The rear portion of the interconnecting element tapers outwardly at 56 as an integral portion of the said fluid-retaining land 50, thereby producing said spool-type piston unit 52 best shown in FIGURE 1. The circular head land 53 operably projects into the inner cylinder 31, and the fluid-retaining land 50 slidably interfits the rearward portion of the bore 16 in fluid sealed contact therewith as shown.

As shown in FIGURE 5, the rear end of the annular piston 46 is provided with a pair of indented slots 57 to maintain fluid communication between an annular fluid space 58 defined by the outer surface of the reduced tubular portion 49 and the confronting surface of the bore 16, said fluid space having continuous communication with the rear compartment 26 of the reservoir via the aforesaid intake port 45, and with another annular fluid space 59 defined by the inner surface of said tubular portion and the exterior surface of the aforesaid interconnecting element 55. Accordingly, it is seen that the intake port 45 maintains fluid communication between the rear compartment of the reservoir and the annular fluid spaces 58, 59 therefore both pistons, particularly their respective head lands 47, 53.

The normally retracted positions of the two pistons 46, 52 define with the closed end of said annular space which defines the outer cylinder 33, and the closed end 34 of the inner cylinder 31 respectively, a pair of coaxial overlapping pressure working-chambers 61, 62, said chamber 61 being of annular configuration corresponding to piston 46 which reciprocates therein, and chamber 62 conforms to the circular configuration of piston head 53 which reciprocates therein, as shown in FIGURE 1. Fluid trapped in these chambers is pressurized and displaced therefrom by simultaneous movement of the two pistons from normally retracted position of FIGURE 1 to protracted positions exemplarily shown in FIGURE 7, to actuate the wheel cylinders shown in FIGURE 13 and therefore apply the brakes as is understood.

The working fluid from chamber 62 is transmitted via discharge passage 35 through the front brake line 35a.

A port 63 through the forward portion of the wall 15 is adapted to maintain communication between the outer working chamber 61 and a cylindrical boss 64 which is chambered as shown and extends horizontally from the exterior of said wall as an integral portion thereof rather than depending from the forward underside of said wall as shown in FIGURES 1 and 3 for convenience in illustrating the structure. This lateral disposition of said boss makes for convenience in connecting the associated rear brake line, as well as keeping the overall height of the unit to a minimum. The chamber 66 in said boss 64 is open at its outer end as shown in FIGURE 1, and terminates in an internally threaded portion 67 which is engaged by the threaded portion 68 of an integral hexagonal flanged cap 69, said cap being tightly impinged against a gasket 71 contiguous to the outer end of the boss wall, to close said chamber fluid-tight. An internally threaded discharge passage 72 passes through the center of said cap and integral threaded portion into communication with said chamber 66, whereby fluid contained in this chamber is discharged through a brake line 72a connected to said discharge passage by means of a commercial hydraulic fitting as shown in FIGURES 1, 2, 3 and 13, and thus actuates, for example, the rear wheel service brakes schematically illustrated in FIGURE 13.

The forward face of the annular head land 47 engages an annular seal 75 comprising a pair of circularly spaced concentric lips 76, 77 connected by a vertical segment (wall) 78 contiguous to said forward face as shown. The spacing of said lips produces a V-shaped concavity therebetween in which is interposed an annular metallic springy element 79 of similar configuration with its inner and outer diverging legs 81, 82 which tend to separate and thereby force the two lips apart in fluid-tight sealing relation with the working surface defining the bore 16 and outer diameter of the tubular member 31 best demonstrated by FIGURE 1A. This springy element serves an additional function by providing a seat for one end of a normally preloaded helically formed compression spring 83 disposed in said working chamber 61 to react between the forward closed end thereof and said seat element and thereby maintain the latter in engagement with the annular seal 75 and bias the annular piston 46 toward its normally retracted position shown in FIGURE 1.

The circular piston head 53 is also provided with the conventional cup seal 84 formed with a forwardly projecting annular lip 85, and a spring cup 86 therefor. Each of the seals 75 and 84 is provided with a bonded washer-like element 87, 88 respectively in the outer peripheral portions of their vertical walls as shown. These washer elements overlie the forward ends of the longitudinal fluid passages 48 and 54 in their respective head lands to control flow of fluid from the reservoir R into the working chambers 61, 62 respectively when the pistons are being withdrawn to normally retracted positions to take the vehicle brakes "off." During such releasing operation, particularly if rapid, a partial vacuum is produced in the working chambers 61, 62 tending to cavitate them which is prevented by fluid from the reservoir communicating with the piston head lands via said intake port 45, and passing through said longitudinal passages and flutes 91, 92 in the outer peripheral surfaces of the two seals 75, 84 as shown into the chambers 61, 62. Presence of such vacuum condition in said working chambers enables the washer elements to slightly withdraw from the forward confronting ends of the longitudinal passages to permit fluid flow into said working chambers and thereby maintain them filled until the pistons are fully retracted as shown in FIGURE 1 wherein the two compensating passages 44, 94 are uncovered enabling fluid adjustment in said chambers to that contained in the reservoir R in readiness for another pressurizing operation to apply the vehicle brakes as is understood.

The fluid compensating channel 94 is indented longitudinally in the working surface of the inner cylinder 31 adjacent the inner end thereof as best shown in FIGURES 1A and 5. This channel extends forwardly slightly past the end of the lip 85 of the cup seal 84 when the dual-pistons are in their fully retracted positions, thus placing this channel in communication with the interior of the inner cylinder 31 disposed ahead of said seal and therefore the working chamber 62 to enable fluid adjustment therein to that contained in the rear compartment 26 of the reservoir R, such compensating flow of fluid moving through the annular spaces 58, 59 aforesaid and intake port 45 to compartment 26 of the reservoir. In this manner any excess fluid present in the working chamber upon fully retracting the inner piston unit 52, is vented to the reservoir so that the pressure status of the fluid is the same in both when the brakes are "off."

Optionally, a modified compensating passage system is provided for the inner cylinder such as shown in FIGURE 6, in lieu of the surface channel 94 of FIGURE 1, and comprises a blind longitudinal bore 95 extending a predetermined distance into the wall 32 of the inner cylinder, said blind bore being intersected by a transverse channel 96 indented in the working surface of said cylinder so that when the dual-pistons are in fully retracted disposition as shown in FIGURE 1, the forward edge of the lip 85 of the cup seal 84 is spaced slightly to the right of said cross channel to uncover the same and thereby interconnect the working chamber 62 with the annular spaces 58, 59 to enable fluid adjustment into the rear compartment 26 of the reservoir R via intake port 45.

The conventional residual pressure check-valve generally designated RV is disposed at the forward end of the inner cylinder 31 as shown in operative association with the discharge passage 35. This residual check-valve RV is of well known construction and operation and comprises: a removable ring-like valve seat 98, preferably made of molded rubber, encircles the inner marginal end of the discharge passage 35 in intimate contact with the finished surface defining the inner side of the end wall 34 as shown, a cup-shaped housing 99 is provided with a central opening 101 through its end wall 102, and its open end terminates in an annular outturned flange 103 disposed parallelly to the said end wall 102 to movably engage the seat 98, said check-valve assembly including a one-way discharge check-valve 104 spring-biased in opposition to fluid displacement from the working chamber 62, into engagement with an annular valve seat 105 defining the inner marginal portion of the opening 101. The residual and one-way valves function to establish the minimal line pressure of 6–8 p.s.i. in the brake lines and connected wheel cylinders (see FIGURE 13), and displacement of pressurized fluid from the working chamber 62 into the brake line 35a to operate the front wheel service brakes, for example.

Another normally preloaded helically formed compression spring 107 is operably disposed in the working chamber 62 to react between the residual valve flange 103 and spring cup 86 to control said residual pressure check-valve RV and also maintain the cup seal 84 in contact with the head land 53 and thereby bias the inner piston unit 52 toward fully retracted position shown in FIGURE 1. It is important to note that the annular outer piston 46 return spring 83 cooperates with the inner piston return spring 107 to return the latter piston to its normally retracted position, such cooperation being effected by the rear end of the annular piston engaging the fluid-retaining land 50 whereby retractive movement of the outer piston is effective on the inner piston unit 52, and conversely protractive movement of the inner piston unit 52 is effective on the outer piston 46 to move as a unit in a fluid pressurizing direction whereby both return springs 83, 107 are overcome.

Operably disposed within chamber 66 of the lateral boss 64, is a residual pressure check-valve RV identical to the one shown in the working chamber 62 and described in detail above. This latter residual valve controls fluid flow from the discharge passage 72 in the same manner as previously described in connection with the first-mentioned residual check-valve. However, the flange 103 is adapted to engage a similar removable ring-like valve seat 98 which in turn engages the inner face of the threaded portion 68 of the flanged cap 69 as shown, and a normally preloaded helically formed compression spring 108 operably disposed within the chamber 66 is adapted to react between the valve flange 103 and closed end of said chamber to control only the operation of said residual check-valve to establish the minimal brake line pressure at 6–8 p.s.i., and not serve the additional piston return function characterizing the return spring 107.

Coaxially disposed in the fluid-retaining land 50 and adjacent portion of the piston-carrying element 55 of the piston unit 52, is a concavity (socket) 111 which receives the free end of an actuating (push-rod) PR in engagement with the bottom of said socket. The opposite (outer) end of said push-rod is pivotally connected at 112 to an intermediate portion of an arm pivotally suspended at 113 on a fixed member 114 of the vehicle with the lower end of said arm terminating as a foot-pad 115, to produce a brake-pedal generally designated P whereby foot pressure applied to the foot-pad swings the pedal P about its pivot 113 and thereby drives the push-rod PR from FIGURE 1 position to the left toward FIGURE 7 position and thus moves the inner piston unit 52 and therefore the outer piston 46 as a unit via the aforesaid one-way mechanical connection MC, to initially close the compensating passages 44 and 94 to condition the working chambers 61, 62 respectively for pressurizing the fluid therein upon applying additional operator pressure to the pedal P, and consequently move the dual-pistons as a unit further into their respective cylinders to induce the required pressure on the brake fluid according to the braking force required.

A detachable hub-type cylindrical stop member generally designated SM is provided at its inner end with an annular outturned flange 116 and spaced rearwardly from said flange is an external annular groove 117 which serves to anchor the forward beaded end of a dust boot BT (see FIGURE 13) which protects the internal working parts of the dual-cylinders. This stop member is coaxially positioned in the counterbore 21 aforesaid with its flanged end contiguous to the annular shoulder 22, and the right marginal peripheral face of said flange being engaged by a split retainer ring 118 which in turn engages the internal groove 23 embedded in the surface of said counterbore as shown, to stabilize said member in the counterbore. The forward face 119 on the flange 116 is abutted by the confronting end face 120 on the fluid-retaining land 50 when the dual-pistons 46, 52 are in fully retracted positions as shown in FIGURE 1 thus establishing these fluid-displacing components in normal brake "off" disposition.

*Modified intake port control and operation* (FIGURE 8)

Another modification of the present master cylinder is shown in FIGURE 8 wherein a separate intake port is provided for each of the cylinders 31, 33 in the following manner:

The reservoir partition wall 24 is relocated sufficiently to the right of its FIGURE 1 position to enable the intake port 45 to communicate with the front reservoir compartment 25, as well as the compensating port 44 without relocating the latter.

In circular alignment with the partition wall 24 is an internal annular groove 121 embedded in the finished surface of the bore 16 in longitudinally spaced relation to the right of the intake port 45, and another intake port 122 is provided through the wall 15 of the bore 16 to the immediate right of said relocated partition wall. The peripheral marginal portion of an annular resilient partition seal 123 is adapted to engage said groove to stabilize said seal in circular alignment therewith. The inner periphery of this seal has a fluid-tight wiping contact due to inward radial bias with the outer cylindrical surface of the reduced tubular portion 49 of the outer piston 46, such biasing action being induced by the inherent resilient tendency for the seal to normalize the opening 124 therethrough which is normally of less diameter than the outer diameter of said tubular portion. Accordingly, the annular seal partition 123 functions to convert the constant volume annular fluid space 58 of FIGURE 1 embodiment into front and rear variable volume annular fluid spaces 125, 126 respectively, with the space 125 in continuous communication with the compensating port 44 and intake port 45, and the space 126 in continuous communication with the compensating channel 94 and intake port 122. The annular fluid space 59 which serves the inner piston unit 52 is maintained in fluid communication with the annular fluid space 126 via the slots 57 indented in the rear (right) end of the reduced tubular portion 49, and, since the latter space continuously communicates with the rear reservoir compartment 26 via the intake port 122, it is seen that the dual-cylinder 31, 33 communicate with their respective reservoir compartments by means of separate and independent compensating and intake ports, therefore hydraulic failure affecting one cylinder cannot affect the other cylinder, because each of the cylinders has its own fluid supply and control ports.

This modified arrangement of the intake ports to enable the dual-cylinders to function independently insofar as fluid control operations are concerned, in no way disturbs the novel overlapping coaxial compactness of the cylinders and cooperating pistons disclosed in the main embodiment wherein the single intake port for both of the cylinders would under certain operating conditions dissipate the fluid from both compartments of the reservoir as a result of accelerated "pumping" action with one of the cylinders inoperative. Such "pumping" action tends to produce a partial vacuum in the working chamber of each cylinder as a function of the seated status of their respective residual pressure check-valves RV notwithstanding one of the brake lines is fractured, and in consequence such vacuum condition would tend to pull some fluid over the outer lips of the two piston seals and discharge the same into both working chambers, and thereby wasting the fluid through the fractured brake line. However, if the operator releases the brake-pedal slowly such vacuum condition is minimized if present at all, and therefore no fluid would be lost through the fractured line communicating with the inoperative cylinder.

In the FIGURE 1 embodiment, loss of fluid from the front reservoir compartment 25 due to the associated brake line being fractured would in no way disable fluid control by the inner cylinder 31 which is served by the rear reservoir compartment 26, but if the annular seal 75 carried by the piston head 47 should draw fluid from this compartment over its outer lip into the working chamber 61, it is seen that eventually all of the fluid in the rear reservoir compartment would be lost which in turn would render the inner cylinder inoperative notwithstanding its connected brake line is completely operative to convey the pressurized brake fluid to the front or rear service brakes as the case may be. This same condition would affect the outer cylinder 33 even though, if the inner cylinder 31 became inoperative since both cylinders are served by the common intake port 45 communicating with the rear reservoir compartment 26, which enables the inoperative cylinder to "pump" fluid therefrom in response to rapid operation of the brake-pedal P.

*Modified one-way mechanical drive enabling the dual-pistons to effectuate pressurized fluid compensation (FIGURES 9, 10, 11 and 12)*

The main embodiment of FIGURE 1 is adapted primarily to actuate a pair of independent hydraulic systems requiring quantities of fluid which bear in a general sense a predetermined ratio to each other, exemplarily shown in this figure as the conventional front and rear service braking systems of an automotive vehicle. In this application of my invention, it is desirable to proportion the displacement head lands 47, 53 so that displacement of one land is susbtantially the same as the other with respect to the systems actuated by each. Therefore, the systems connected to their respective working chambers 61, 62 would require the same volume of brake fluid, and protractive movement of the displacement lands 47, 53 would be equal thus unitary. If, however, the above desirable ratio should become disturbed as by leakage, wear in the fluid working parts, etc., thus requiring more fluid displacement from one working chamber than from the other to set both front and rear service brakes "solid" for firm application thereof, relative movement of the displacement members 46, 52 would be requisite to effect such additional fluid displacement therefore compensate for the fluid demand in the inadequate working chamber by protracting its cooperative fluid displacement member relatively to the other displacement member to counterbalance the pressures in both working chambers and thereby apply the front and rear service brakes with equal intensity.

Also, as pointed out above, unequal wear in the brake systems connected to the working chambers 61, 62 would produce differential fluid displacement requirements and thereby necessitate relative movement between the displacement members 46, 52 to bring about uniform pressure within both systems.

Therefore, according to this modified principle of my invention, a novel one-way mechanical compensating mechanism or device generally designated CD is provided which will move the piston head further into its cyilnder requiring additional fluid displacement upon the other piston becoming stabilized against further movement due to its connected system having set up "solid." Thus, when wear has occurred to the extent that unitary movement of the two pistons 46, 52 does not set both front and rear service brakes up "solid," additional movement of the piston in the inadequate cylinder can be effected while maintaining the other piston in "solid" brake-applying position, to bring both pistons into "solid" relationship.

As shown in FIGURE 9, this novel compensating device CD is operatively incorporated between corresponding ends of the two pistons as a substitute for the one-way mechanical connection CM of the FIGURE 1 embodiment, and comprises: a composite inner piston unit formed by separating the fluid-retaining piston 50 from the piston-carrying element 55 so that the piston is capable of relative and unitary movements with respect to the inner and outer piston head lands 53, 47 respectively, said retaining piston may therefore be termed an "actuator" common to both pistons 46, 132, and which is identified by reference numeral 131, and the modified inner piston designated 132. The outer piston 46 has its free end 133 spaced from an annular confronting face portion 134 defined by a plurality of circumferentially spaced V-shaped embossments on the fluid-retaining piston actuator 131, and the corresponding free end of the inner piston 132 is equally spaced and therefore normally in circular alignment with the free end of the outer piston 46. Movement of the fluid-retaining piston acuator 131 is transmitted through a balancing lever assembly generally designated LA and includes a plurality of radially disposed lever elements 135 corresponding in number to the aforesaid embossments on the said actuator 131. These lever elements comprise upper and lower segments with their extremes 136, 137 in engagement with the free ends of said pistons 46, 132, respectively, and their intermediate portions 138 fulcrumed contiguously to the apexes of said embossments respectively. The diverging faces of said V-shaped embossments provide abutments for the upper and lower confronting segments, respectively, of each of said lever elements to limit the compensating movement thereof thus enabling the actuator 131 to actuate either piston 46 or 132 in a fluid-pressurizing direction when the other piston is inoperative. A like-number of projections (struts) 139 is utilized to fulcrum said lever elements on said actuator 131, each of which comprising a rectangular-shaped body portion 141 fixed in a complemental socket 142, or otherwise, in each of said embossments, and a free integrally projecting portion 143 of rectangular shape narrower than the body portion, to provide fulcrum points 144, 145 on opposite sides thereof on the forward edges of the body portion, said fulcrum points being preferably of circular face contour and normal to said narrow portions, respectively, best demonstrated in FIGURE 12. The narrow portions 143 loosely project through complemental apertures 146 in the lever elements so that their lateral face portions 147, 148 adjacent opposite ends of said apertures, will bear against the fulcrum points 144, 145, respectively, and the terminating portion of each narrow projecting portion 143 is formed as an outwardly turned flange 149 terminating in a curved surface 151 complemental to the inner cylindrical surface of the outer piston 46. It is thus seen that the construction of each projection 139 serves to provide intermediate fulcrum points for the lever elements 135 with respect to the fluid-retaining piston actuator, and the outwardly turned flanges 149 serve as retaining means to prevent fortuitous displacement of the lever elements out of their normal operating positions as shown, and the curved ends 151 of each flange serves as a bearing support for the outer end of the piston 46 to maintain the latter in its true rectilinear path of movement within the cylinder 33.

The concavity (socket) 111 in the fluid retaining piston 50 of FIGURE 1 is divided into two coaxial sections 152, 153 as shown in FIGURE 9 of the present modification, due to separation of the piston-carrying element 55 of the inner piston 132 from said piston 50 to produce the fluid-retaining actuator 131. A cylindrical cup-shaped member 154 is provided with an elongated body portion 155 having a closed end 156 and an open end 157. The open end is annularly flanged outwardly at 158 and engages a complemental annular recess 159 which defines the marginal portion of the outer end of the socket portion 153 in the fluid-retaining actuator 131 thus closing the open end of said socket. The elongated body portion 155 projects through the socket sections 152, 153 with its closed end 156 normally spaced at 161 from the closed end of the socket section 152 as shown, said space continuously communicating with said annular static chamber 59 via radial ports 162 through the wall of socket section 152. This relative disposition of the cup-shaped member 154 and inner piston element 55 enables the cup-shaped member to move relatively to said inner piston, and the fluid-retaining actuator 131 to move as a unit with said member 154 and relatively to both pistons 46, 132 to actuate the lever assembly LA as a unit with said pistons, or relatively to said pistons in the case of fluid compensation being required in one of the working chambers.

The free end of the push-rod PR projects into the member 154 for engagement with the closed end 156 thereof whereby protraction of the push-rod under influence of pedal P is effective to actuate the fluid-retaining actuator 131 as a unit.

In the normal vertical disposition of the lever elements 135 as shown in FIGURE 9, actuation of the actuator 131 also moves these levers and the two connected pistons 46, 132 as a unit under conditions of balanced fluid displacement requirements from said pistons to set the front and rear service brakes "solid," but in the event that the inner piston 132, for example, goes "solid" before the outer piston 46, additional relative protraction of the latter piston would be required to bring it to a corresponding "solid" stabilized status. Under such conditions additional pressure on the brake-pedal P would actuate the actuator 131 relatively to the outer and inner pistons 46, 132 with resultant rotation of the lever elements 135 in a counterclockwise direction from the operator's viewpoint of the upper element in FIGURE 9 to the position shown in FIGURE 11, on their respective projection fulcrums which, under such conditions, automatically convert to pressure points, and the inner ends of the lever elements fulcrum on the inner stabilized piston-carrying element 55 to enable application of pressure at their outer ends to the outer piston and thereby move the same relatively to the inner piston to compensate for fluid demand in the system served by the outer piston so that both pistons will set their respective brake systems in "solid" brake-applying condition. Therefore, the lever assembly LA may in the broader patent sense, be termed a "balancing mechanism" operatively disposed between the two pistons to enable one piston to move farther than the other into their respective cylinders so that equalized pressures may be developed in both braking systems to set the brakes firmly. As shown in FIGURE 11, the lever elements 135 are capable of being further rotated on their respective fulcrums to such an angle so as to be contiguous to one or the other of the diverging faces defining each of said V-shaped embossments defining portion 134. Under such conditions, if the brake system controlled by the inner piston 132, for example, is operative and the brake system controlled by the outer piston 46 is inoperative, the lower diverging faces of the V-shaped embossments would be abutted by the lower segments of the balancing levers 135, respectively, thus enabling the actuator 131 to actuate the operative brake system notwithstanding the other brake system is inoperative.

According to the principles of the FIGURE 9 modification, the biasing forces including piston return springs 83, 107 against the pistons 46, 132 would be incorporated so as to apply substantially equal reactions thereagainst to establish the pistons in their respective fully retracted positions as shown in FIGURE 9 wherein the lever elements 135 are disposed in radial alignment. If, however, these two return springs should fail to effect unitary retraction of the two pistons, which operation is requisite for the two compensating passages 44, 94 to be uncovered to enable fluid adjustment between the working chambers 61, 62 and their respective reservoir compartments, I have provided positive piston stop means in the way of one or more round-headed cap screws 163 threadedly attached to the right end of the inner cylinder wall 32 as shown in FIGURES 9 and 11. The diameter of the round head 164 of this screw is greater than the thickness of said wall so that diametrically-opposed peripheral portions thereof extend into the path of confronting abutting portions on the pistons, respectively. A longitudinal channel 165 extends forwardly from the free end 133 of the outer piston 46 a predetermined distance in the inner surface thereof, to produce an abutment shoulder 166 adjacent the forward end of said piston. This channel slidably receives one of the peripheral portions of the round head 164 so that when the pistons are retracted as shown in FIGURE 9, the abutment portion on the inner piston head land 53 and the abutment shoulder 166 on the outer piston 46 engage the opposed peripheral portions on the cap screw head to positively define the fully retracted positions of the two pistons therefore the radial alignment of the lever elements 135 and the open status of the compensating passages 44 and 94 between the working chambers 61, 62, respectively, and their respectively associated reservoir compartments 25, 26. The length of the channel 165 is such that the full operating stroke of the outer piston 46 is accommodated without disengaging the cap screw head therefrom.

*Modified cylinder operation for sequential control of automotive master clutch and brakes (FIGURES 14 and 15)*

The invention contemplates that one of the cylinders of the present dual-cylinder hydraulic actuator could obviously be adapted to operate apparatus other than vehicle brakes, leaving the other cylinder connected to operate both front and rear service brakes. Reference is made to FIGURES 14 and 15 which illustrate two such modified arrangements wherein the FIGURE 14 modification shows lost-motion LM is introduced between the one-way mechanically engageable portions on the two pistons 46, 52, respectively, to enable initial pedal depression to effect hydraulic disengagement of the conventional spring-engageable master friction clutch CL indicated fragmentarily by one of its releasing (operating)

levers 171 and output shaft 172, such a clutch being conventionally interposed in the vehicle drive line between the engine flywheel (not shown) and the associated manual-shift transmission fragmentarily indicated at MT. Rotation of the releasing levers 171 in a clockwise direction as viewed in FIGURE 14 is effective to separate the clutch friction members (not shown) to disengage them thus effecting a declutching operation as is understood. An hydraulic clutch-servo shown at CS in concentric relationship to the said output shaft 172 includes an annular-type servo piston 173 and a pressure-applying annular working chamber 174 therefor including a drain line 175 for returning seepage past the piston to the reservoir R. A pressure input passage 176 leading to said working chamber passes through the wall of said clutch-servo, and is connected by means of a commercial hydraulic fitting 177 to the aforesaid hydraulic line 35a which in turn communicates with the discharge passage 35 associated with the inner cylinder 31 of the master cylinder as shown.

The residual pressure check-valve RV serves the same purpose previously described in connection with the main embodiment, of controlling the minimal line pressure external to cylinder 31 so that the line 35a and working chamber 174 are maintained filled with actuating fluid under a diminutive non-activating pressure to prevent slack in the system with consequent erratic operation when the pedal P is operated to actuate the servo-piston. The fully retracted position of the servo-piston is shown in FIGURE 14 wherein the clutch CL is fully engaged under the action of its engaging-springs (not shown) as is understood.

As shown in FIGURE 14, the aforesaid lost-motion LM between the pistons 46, 52 is provided by eliminating that portion of the rear (right) end of the outer piston 46 in which the aforesaid chamber interconnecting slots 57 are incorporated (see FIGURE 1 embodiment), thus spacing this end of the outer piston 46 from the fronting annular face portion 178 on the forward side of the fluid-retaining land 50. The said face portion 178 defines with the body portion proper of the retaining land 50 a forwardly offset cylindrical portion 179 which is adapted to interfit the inner end portion of the outer piston 46 to slidably support the latter. As shown on the drawing, the offset portion 179 replaces the tapered integral portion of the piston-carrying element 55 (see FIGURE 1 embodiment). A split stop ring 181 is adapted to engage an internal annular groove 182 formed in the bore 16 slightly to the left of the intake port 45, the latter being relocated slightly to the right of its FIGURE 1 position to accommodate installation of said stop ring and groove without intersecting said port. This stop ring is engaged by the peripheral marginal portion 183 on the back side of the piston head 47, to define the lost-motion spaced relationship between the pistons when fully retracted whereby pedal-actuation of the pistons 46, 52 occurs in the sequence of declutching by the inner cylinder 31 followed by brake application upon activation of the outer cylinder 33.

It is thus seen that the clutch CL can be disengaged to facilitate manual-shifting of the transmission, or to disconnect the engine from the transmission, for example, during a temporary stop as at a traffic light with the engine running, independently of applying the service brakes, and that the clutch CL can be maintained disengaged during application of the service brakes.

Thus, in the foregoing modified application of my dual-cylinder unit DC, the inner cylinder 31 would be connected to operate the clutch-servo CS to disengage the clutch CL and thereby facilitate manual-shifting of the transmission MT, or to enable starting the engine in the case of engine stall under coasting load drive as a consequence of the clutch being engaged and transmission "in-gear," the outer cylinder 33 would be connected to both front and rear wheel service brakes to operate the same. In this manner, my novel twin-cylinder unit would enable operation of both the vehicle clutch and brakes in that order in response to sequential operation of the brake-pedal P serving as a single control member for both, with the added advantage of eliminating the conventional foot-operated clutch pedal.

Another modification of the dual-cylinder arrangement is demonstrated by FIGURE 15 wherein the same structure of FIGURE 1 embodiment is utilized to effect clutch-disengagement and brake application as described in connection with the FIGURE 14 modification. The compensating port 44, however, is spaced sufficiently ahead of the edge of the outer lip of annular seal 75, to delay operativeness of the outer cylinder 33 by permitting fluid from the working chamber 61 to return to the front reservoir compartment 25, until the inner cylinder 31 has effected the delutching operation. Therefore, such spacing of the compensating port 44 accomplishes the same sequence of operations as provided by the lost-motion connection LM between the pistons of FIGURE 14 modification.

In operation, initial movement of the pedal P activates the inner piston unit 52 to close its cooperating compensating channel 94 to condition the inner cylinder 31 to pressurize the fluid therein and displace the same into the working chamber 174 and thereby operate the releasing levers 171 to disengage the engine clutch CL, further depressing of the pedal disposes the outer lip of the annular piston seal 75 of the outer piston over the compensating port 44 to enable the outer cylinder 33 to pressurize the fluid and thereby apply the brakes while at the same time maintaining the clutch CL disengaged by further separation of the friction members (not shown).

It is thus seen that this latter modification further simplifies the FIGURE 14 arrangement for the same purpose since no structural changes are required, only the mere relocating of the compensating port 44 to the left is necessary to introduce the lost-motion of FIGURE 14 between the pistons 46, 52 to enable their respective cylinders 31, 33 to sequentially effect the said declutching and braking operations from a single control member such as the pedal P.

*Operational summary*

In the relative positions of the parts shown in FIGURE 1, my novel dual-piston master cylinder DC is in fully retracted disposition. The fluid in the working chambers 61, 62 is at atmospheric pressure corresponding to that contained in the two compartments of the reservoir R in consequence of the compensating passages 44 and 94 being open, and the line pressure to the wheel cylinders which actuate their respective brake assemblies is at substantially 6–8 p.s.i. in accordance with the spring setting of the residual pressure check-valves RV associated with the discharge passages 35, 73, respectively. Under these conditions the dual-fluid-displacing components 46, 52 may be said to be in their normal positions in readiness for simultaneous movement as a consequence of depressing the pedal P, to move the fluid from their respective working chambers 61, 62 through their associated one-way discharge check-valves in their respective residual check-valves into the discharge passages 35, 73 and separate brake lines 35a, 72a, respectively, to apply the front and rear service brakes of the vehicle.

Initial movement of the dual-pistons 46, 52 as a unit from the FIGURE 1 disposition toward FIGURE 7 disposition, first isolates the compensating passages 44 and 94 from their respective working chambers which conditions the pistons to effect pressurization of the fluid trapped in said chambers and displace said fluid under pressure into the connected brake lines 72a, 35a, respectively, to operate the vehicle brakes shown in FIGURE 13 as is understood. Accordingly, operation of my dual-piston master brake cylinder is similar to the conventional single-piston master cylinder used in present-day hydraulic braking systems without sacrificing any of the timeproven operating characteristics such as "pumping" the brakes on, and "feathering" action of the pedal for full control of the brakes to prevent cavitation in the dual systems or for inching the vehicle as when parking.

To release the brakes, the operator merely has to remove foot pressure from the pedal P and in consequence of which, the brake shoe return springs and piston return springs 83, 107 team together to bias said pistons toward normally retracted positions shown in FIGURES 1 and 1A wherein the forward edges of the outer lips 77, 85 of the seals 75, 84, respectively, are disposed slightly to the right of the compensating passages 44, 94 to interconnect their respective working chambers 61, 62 with the reservoir R via the annular fluid spaces 58, 59 interconnected by slots 57 and the common intake port 45 or modifications thereof.

From the foregoing description augmented by an inspection of the drawing, it will be seen that I have produced a new and improved dual-piston master cylinder which operates in a manner similar to conventional single-piston master cylinders, but is characterized by the advantage of providing a double-safety brake system so that in the event of hydraulic failure in the front brakes, for example, the rear brakes can still be operated and, conversely, should the rear brakes fail, the front ones are still operative, and, without loss-of-pedal from the position occupied when the rear brake line became inoperative.

In present-day cars equipped with the conventional single master brake cylinder, should hydraulic failure occur at any point the service brakes at all four wheels are instantly rendered ineffective.

The dual-pistons operate as a unit in a fluid-pressurizing direction of movement through mechanical connecting means or optionally mechanical compensating means rather than via a hydraulic connection, the latter having the serious disadvantage of rendering both cylinders inoperative notwithstanding one of them is still operative upon failure in the other cylinder due to such hydraulic connection being lost along with the failure of the ineffective piston normally acted on by the brake-pedal. This condition can be quite hazardous if an over amount of pedal lost-motion movement is introduced into the system, since in tandem dual-piston arrangements the forward (secondary) piston "floats" thus depending for its normal operation on its hydraulic connection with the primary rearwardly disposed piston mechanically connected to the brake-pedal. Therefore, if hydraulic failure occurs in the circuit served by the primary piston, the aforesaid hydraulic connection is also lost, and if the lost-motion of the brake-pedal is such that it engages the toe board before the primary piston can act mechanically "straight-through" on the forward secondary piston to operate the same and connected brakes, the four service brakes would be rendered inoperative despite the forward secondary cylinder being operative to apply the connected set of brakes if sufficient operating stroke were available.

Accordingly, with the present dual-cylinder unit DC if the front and rear service brakes are operative at a given pedal height from the toe board, failure of one of the cylinders cannot change such pedal position thus providing sufficient pedal to control the vehicle by the operative cylinder.

It will further be appreciated from the foregoing description, taken in connection with the various illustrations of the different embodiments of my invention, that the objects hereinbefore enumerated and otherwise disclosed have been achieved with the result that I have provided a simplified and compact design of a multiple cylinder hydraulic actuator which incorporates a one-way mechanical drive between the displacement members to compensate for an increased fluid demand by one portion of the cylinder over the other, and includes a lever assembly interconnecting said displacement members with a common actuator actuated from the brake-pedal for compensating for an increase in fluid demand of the one portion of the master cylinder. It will be further seen that a simplified mechanical hook-up is provided between the two displacement members and brake-pedal whereby a minimal actuating movement is required to render both cylinders operative, and that the inoperative status of one of the cylinders cannot appreciably augment such movement thus assuring that sufficient pedal is always effective to control the vehicle whether both systems or only one of them is operative.

It will be further seen that certain inter-related components of my duel-cylinder hydraulic actuator possess similar functional characteristics such that interchangeability is readily effected, particularly in connection with the mechanical connection between the pistons, relative arrangement of the compensating ports and intake ports with respect to the two cylinders and reservoir compartments serving them. For example, both working chambers 61, 62 may communicate via single intake port 45 with the rear reservoir compartment 26, or separate intake ports such as shown in FIGURE 8 interconnecting each reservoir compartment to communicate with their respective working chambers in the manner described. The two piston assemblies may be interconnected by the disclosed one-way mechanical connection MC or by the mechanical compensating device CD, the former connection enabling a one-way drive of the two pistons relatively or as a unit in a fluid-pressurizing direction, while the latter device provides for a one-way mechanical drive of the two pistons which includes a compensating relative movement of one piston with respect to the other stabilized piston, so that both pistons under joint influence of pedal movement will set up the brakes "solid" both front and rear.

Further beneficial results in the control of a motor vehicle equipped with my novel duel-cylinder hydraulic actuator may also be realized, in the selective use of the two cylinders for either full service brake operation, or one cylinder for operating all four service brakes and the other cylinder utilized as clutch control means to enable use of a single control member such as the pedal P to operate the brakes and clutch of a motor vehicle in sequence to effect declutching and operation of the brakes in that order, and therefore on a selective basis.

It should be understood that I do not wish to limit my invention to the above described novel association of elements and details, and that the invention includes such other modifications and substitutions readily apparent to those skilled in the art, as defined by the terms of the subjoined claims.

Having thus described my invention, I claim:

1. A master cylinder of the character disclosed comprising: a cylinder body, a longitudinal bore defining a cylindrical wall in said body open at one end and closed at the other; a two-compartment fluid supply reservoir in said body separated from said bore by said wall; an intake port through the said wall for maintaining fluid communication between one of said reservoir compartments and said bore; a compensating port through said wall in spaced relation to said intake port, for normally interconnecting said bore with the other reservoir compartment; a tubular member closed at the same end as said bore and open at the other end to provide an inner cylinder characterized by an elongated cylindrical wall outwardly flanged at its forward end, and coaxially positioned within the forward portion of said bore in circularly spaced relation thereto to provide an annular outer cylinder therebetween; an annular fluid-displacement unit reciprocable in said outer cylinder from a normally retracted position; an annular pressure-working chamber in said outer cylinder normally defined by the fully retracted position of said fluid-displacement unit and the confronting inner face portion on the closed end of said longitudinal bore, said chamber having communication with the other reservoir compartment via said compensating port when said fluid-displacement unit is fully retracted; a reduced diameter extension defining the forward end portion of said tubular member; a discharge port through said bore wall communicating with said annular working chamber; a cylindrically chambered boss integral with said bore wall and projecting with an open end from the exterior thereof, said latter port being adapted to maintain fluid communication between said boss and annular working chambers; a threaded closure cap for the open end of said chambered boss; a central threaded bore through said cap; an hydraulic line fitting threaded into said central bore of the inner end of the threaded cap; a removable ring-like resilient valve seat contiguous to the said cap; a residual pressure check-valve having an annularly flanged end adapted to engage said valve seat to control minimal line pressure external to said boss and chamber and accommodate discharge of pressurized fluid from said boss chamber into said connected line; a first normally preloaded compression spring operable in said chambered boss to react on the flanged end of said residual check-valve to control the same; a central aperture through the closed end of said longitudinal bore and through which said extension on the tubular member extends to the exterior thereof; a locknut adapted to engage an exposed threaded portion on said extension to stabilize said tubular member in coaxial overlapping relation with respect to the confronting portion of said longitudinal bore; a second normally preloaded compression spring operable in said working chamber to react between the flanged end of said residual pressure check-valve and said fluid-displacement unit to bias the latter toward fully retracted position and to control said check-valve; a circular fluid-displacement unit reciprocable in said inner cylinder from normally retracted position, as a unit with said first-named fluid-displacement unit in a fluid pressurizing direction; a circular working chamber defined by the circular fluid-displacement unit and confronting surface on the closed end of said inner cylinder; a discharge passage through said extension communicating with said last-named working chamber; a removable ring-like resilient valve seat contiguous to the inner marginal face of the inner end of said discharge passage; another residual pressure check-valve having an annularly flanged end adapted to engage said valve seat to control minimal line pressure external to said last-named working chamber, and accommodate discharge of pressurized fluid therefrom into the connected line; a third normally preloaded compression spring operable in said last-named working chamber to react between the flanged end of said other residual pressure check-valve and said circular fluid-displacement unit to bias the latter toward fully retracted position and to control said other check-valve; a compensating channel indented in the inner surface of the wall of said inner cylinder adjacent its rear end to normally interconnect said last-named working chamber and one reservoir compartment via said intake port when said circular fluid-displacement unit is fully retracted; a mechanical force-transmitting connection between said fluid-displacement units enabling movement thereof as a unit from retracted position to fluid-pressurizing protracted position; and operating means for reciprocating said fluid-displacement units simultaneously in a fluid pressurizing direction.

2. A master cylinder constructed in accordance with claim 1 in which said annular fluid-displacement unit comprises: an annular head land defining the forward end of a reduced diameter elongated sleeve member reciprocable in said outer cylinder; an annular shoulder formed at the juncture of the head land and sleeve member; a plurality of longitudinal circumferentially spaced passages through the shouldered portion of said head land; an annular resilient seal having inner and outer radially spaced annular lips interconnected by a vertical segment disposed contiguous to the forward face of said head land for reciprocable movement as a unit therewith; a washer-like valve element defining the peripheral marginal portion of said vertical segment, said valve element being adapted to overlie the confronting ends of said longitudinal passages in the head land to control fluid flow therethrough; and a plurality of surface flutes in the outer surface of the outer lip for conveying fluid past said valve element into the annular variable pressure-working chamber from said one reservoir compartment; an annular spring seat element having a pair of radially diverging legs disposed in the radial space between said lips to bias the latter into sealing relation with their respective working surfaces defining said longitudinal bore and outer surface of the cylindrical wall of said inner cylinder, said spring seat element being adapted to receive reaction from said first-named compression spring.

3. A master cylinder constructed in accordance with claim 2 in which said circular fluid-displacement unit comprises: a spool-type element having a cylindrical head land reciprocable in said inner cylinder and a fluid-retaining land integrally connected in longitudinally spaced relation to said cylindrical head land, said fluid-retaining land being adapted to slidably interfit the rearward portion of said bore; and cooperable with both of said pistons to produce a pair of concentrically-related annular constant volume static fluid chambers normally communicating with said intake port and the compensating port controllable by said cylindrical head land; a passage interconnecting said constant volume chambers; a plurality of circumferentially spaced longitudinal passages through the peripheral marginal portion of said cylindrical head land; a complemental resilient cup seal having a peripheral annular lip and a vertical segment contiguous to the forward face of said cylindrical head land; a washer-like valve element defining the peripheral marginal portion of said vertical segment, said valving element being adapted to overlie the confronting ends of said longitudinal passages in the cylindrical head land to control fluid flow therethrough; a plurality of surface flutes in the outer surface of said annular lip for conveying fluid past said valve element into the circular variable pressure-working chamber from said one reservoir compartment; a complemental spring seat element in said cup seal for receiving reaction from said last-named compression spring.

4. A master cylinder constructed in accordance with claim 3 in which said fluid-retaining land cooperates with said piston lands to define a pair of concentrically-related annular constant volume static fluid chambers normally communicating with said intake port and the compensating port controllable by the said cylindrical head land; and a passage adapted to interconnect said constant volume chambers.

5. A master cylinder constructed in accordance with claim 4 in which said compensating channel indented in the inner surface of the wall of said inner cylinder extends longitudinally from the inner end of said last-named cylinder slightly forward of the edge of the annular lip of the cup seal when the pistons are fully retracted, initial movement of the cylindrical head land effecting closure of the channel to control the annular pressure-working chamber to pressurize the fluid therein.

6. A master cylinder constructed in accordance with claim 4 in which said compensating channel indented in the inner surface of the wall of said inner cylinder extends transversely of said wall in slightly spaced relation to the forward edge of the annular lip of said cup seal when the pistons are fully retracted, initial movement of the cylindrical head land effecting closure of the channel to control the annular pressure-working chamber to pressurize the fluid therein; and a longitudinal bore extending from the inner end of the wall of said inner cylinder to a position intersecting said transverse channel to thereby place the latter channel in communication with one of the constant volume chambers.

7. In a master cylinder having a body, a two-compartment fluid supply reservoir, a longitudinal bore substantially coextensive with said body, and a cylindrical wall closed at one end and open at the other defining said bore and bottom of said reservoir, the improvement which comprises: a cylindrically walled sleeve closed at one end and open at the other, and fixed at its closed end to the closed end of said bore to project into a portion of said bore in circularly spaced relation thereto, and thereby producing an inner cylinder within said sleeve and an outer annular cylinder with respect to said bore in coaxial overlapping relationship to the inner cylinder; an inner piston reciprocable in said inner cylinder; an outer piston reciprocable in said outer cylinder; an inner variable pressure-working chamber provided between said inner piston and closed end of said inner cylinder; an outer variable pressure-working chamber provided between said outer piston and closed end of said bore; a discharge port through the closed end of said inner cylinder communicating with said inner working chamber; another discharge port through the bore wall communicating with said outer working chamber; an intake port through said bore wall for maintaining fluid communication between one of the reservoir compartments and both pistons; a pair of compensating ports incorporated in the bore wall and sleeve wall, respectively, and normally open when the said pistons are fully retracted to place the two reservoir compartments in communication with said two working chambers, respectively; an annular constant volume static fluid chamber normally provided between a different portion of said bore and the outer piston; another annular constant volume static fluid chamber provided between said outer and inner pistons in overlapping concentric relation to said first-named static fluid chamber; a port through said outer piston interconnecting said annular fluid chambers; a one-way force-transmitting mechanical connection between said pistons enabling operating force to actuate both pistons simultaneously in a fluid-pressurizing direction; and an operator member operatable from a normally released position to initially actuate said pistons to close said compensating ports thereby conditioning their respective working chambers to pressurize the fluid therein and discharge the same through their respective discharge ports upon additional actuation of said pistons.

8. In a master cylinder having a chamber-defining body, a two-compartment fluid supply reservoir, a longitudinal bore substantially coextensive with said body, and a cylindrical wall closed at one end and open at the other defining said bore and bottom of said reservoir, the improvement which comprises: a cylindrically walled sleeve closed at one end and open at the other, and fixed at its closed end to the closed end of said bore to project into a portion of said bore in circularly spaced relation thereto, and thereby producing an inner cylinder within said sleeve and an outer annular cylinder with respect to said bore in coaxial overlapping relationship to the inner cylinder; an inner piston reciprocable in said inner cylinder; an outer piston reciprocable in said outer cylinder; an inner variable pressure-working chamber provided between said inner piston and closed end of said inner cylinder; an outer variable pressure-working chamber provided between said outer piston and closed end of said bore; a discharge port through the closed end of said inner cylinder for said inner working chamber; another discharge port through the bore wall of said outer cylinder for said outer working chamber; a pair of intake ports through the bore wall for maintaining fluid communication between said two reservoir compartments and both pistons, respectively; a pair of compensating ports incorporated in the walls of said bore and sleeve, respectively, and normally open when the said pistons are fully retracted, to place the two reservoir compartments in communication with the two working chambers, respectively; a fluid-retaining land integral with and spaced from said inner piston to slidably interfit a different portion of said bore in fluid-tight sealed relation; an annular fluid space provided between a portion of said outer piston and said fluid-retaining land; an annular partition wall intermediately disposed between said outer piston portion and fluid-retaining land to divide said annular fluid space into a pair of annular variable volume static fluid chambers adapted to communicate with said pair of intake ports, respectively; an annular constant volume static chamber provided between said outer and inner pistons; a port through a different portion of said outer piston for interconnecting said constant volume chamber with one of said variable volume static chambers; a one-way force-transmitting mechanical connection between said pistons enabling operating force to actuate both pistons simultaneously in a fluid-pressurizing direction; and an operator member operable from a normally released position to initially actuate said pistons to close said compensating ports to condition their respective working chambers to pressurize the fluid therein and discharge the same through their respective discharge ports upon additional actuation of said pistons.

9. In a combined dual master cylinder and a two-compartment fluid supply reservoir therefor: a pair of coaxial telescopically-related cylinders; a pair of pistons reciprocable in said cylinders, respectively; spring means for biasing said pistons toward fully retracted positions; a pair of compensating ports between said reservoir compartments and cylinders, respectively, said ports being normally open when said pistons are fully retracted; an intake port between said pistons and one of said reservoir compartments; a fluid-retaining land slidably interfitting one of said cylinders and cooperable with both of said pistons to define a pair of overlapping concentrically-related annular constant volume static fluid chambers normally communicating with said intake port and the compensating port controlled by one of said pistons; a one-way force-transmitting mechanical connection between said pistons enabling operating force to simultaneously actuate both pistons in a fluid-pressurizing direction; an operator-operated member operable from normally released position to actuate said pistons to initially close said compensating ports and then pressurize the fluid within said cylinders; and a pair of discharge ports communicating with said cylinders, respectively, for conveying such pressurized fluid therefrom.

10. In a combined dual master cylinder and a two-compartment fluid suply reservoir therefor: a pair of telescopically-related cylinders; a pair of pistons reciprocable in said cylinders, respectively; spring means for biasing said pistons toward fully retracted positions; a pair of compensating ports between said reservoir compartments and cylinders, respectively, said ports being normally open when said pistons are fully retracted; a pair of intake ports between said pistons and reservoir compartments, respectively; a fluid-retaining land slidably interfitting one of said cylinders and coaxially cooperable with both of said pistons to define a pair of concentrically-related annular fluid spaces; a partition wall fixed to said one cylinder between one of said pistons and said fluid-retaining land, for converting one of said annular fluid spaces into a pair of annular variable volume static fluid spaces which normally communicate with said pair of intake ports, respectively, with the other annular fluid space being continuously charged with constant volume of static fluid; a passage between said other annular fluid space and one of said variable volume fluid spaces; a one-way force-transmitting mechanical connection between said pistons enabling operating force to be applied simultaneously to both pistons in a fluid-pressurizing direction; an operator-operated member operable from normally released position to actuate said pistons to initially close said compensating ports and then pressurize the fluid within said cylinders; and a pair of discharge ports communicating with said cylinders, respectively, for conveying such pressurized fluid therefrom.

11. In a combined dual master cylinder and a two-compartment fluid supply reservoir therefor: a pair of coaxial telescopically-related cylinders; a composite mechanical assembly comprising a pair of piston-like elements complemental to and slidable in said cylinders, respectively; a pair of variable pressure-working chambers in said cylinders, respectively, and activatable by said piston-like elements when moved from normally retracted position; a pair of discharge passages communication with said working chambers, respectively; a pair of compensating ports between said reservoir compartments and said working chambers when said piston-like elements are fully retracted; a fluid-retaining land longitudinally spaced from one of said piston-like elements and movable as a unit therewith in slidably interfitting relation to one of said cylinders; a pair of annular static fluid chambers disposed between one of said cylinders and the other piston-like element and between said piston-like elements, respectively, in concentric overlapping relation; fluid passageway means adapted to maintain fluid communication between one of said reservoir compartment and one of said annular static chambers; a passage between said piston-like elements; spring means including a pair of normally preloaded spring operable in said working chambers, respectively, to bias said piston-like elements toward fully retracted positions; a one-way force-transmitting mechanical connection between said piston-like elements enabling unitary sliding movement thereof into their respective cylinders; and an operator-operated member operable from a normally released position for slidably moving said pair of piston-like elements in opposition to reaction from said spring means.

12. In a dual-cylinder hydraulic actuator characterized by coaxial telescopic overlapping cylinders, a two-compartment fluid supply reservoir for said cylinders, respectively, separate lines from said cylinders connected to convey actuating fluid to operate the main clutch and brakes of a motor vehicle, a pair of pistons operable in said cylinders, respectively, for pressurizing the fluid in their respective working chambers therebetween, a pair of discharge ports for said working chambers, respectively, a pair of compensating ports interconnecting the two reservoir compartments with their respective working chambers when said pistons are fully retracted, a common intake port between one of said reservoir compartments and both of said pistons, a lost-motion mechanical connection between said pistons enabling relative and unitary movements thereof in a fluid pressurizing direction, a pair of annular static fluid chambers disposed in concentric overlapping relationship between said pistons; a passage interconnecting said static fluid chambers, and an operator-operated member operable from a normally released position for actuating one of said pistons directly and the other piston through said mechanical connection upon said lost-motion being taken up, in the sequence of disengaging the main clutch and operating the brakes.

13. In a dual-cylinder actuator characterized by coaxial telescopic overlapping cylinders, a two-compartment fluid supply reservoir, separate lines from said cylinders connected to convey actuating fluid under pressure to operate the main clutch and the brakes of a motor vehicle, a pair of pistons operable in said cylinders, respectively, for pressurizing the fluid in their respective working chambers therebetween, a pair of discharge ports for said working chambers, respectively, a pair of compensating ports interconnecting the two reservoir compartments with their respective working chambers when said pistons are fully retracted, a lost-motion mechanical connection between said pistons enabling relative and unitary movements thereof in a fluid pressurizing direction, a pair of concentric annular spaces containing static fluid between said pistons, a fixed partition wall between the outer annular space for dividing the same into a pair of annular static fluid chambers, a passage for interconnecting one of said static fluid chambers with said other static fluid space, a pair of intake ports between said reservoir compartments and said annular static fluid chambers, respectively, and in operator-operated member operable from a normally released position for actuating one of said pistons directly and the other piston through said mechanical connection upon said lost motion being taken up, in the sequence of disengaging the main clutch and operating the brakes.

14. A master cylinder of the character disclosed comprising: a cylinder body, a longitudinal bore defining a cylindrical wall in said body open at one end and closed at the other; a two-compartment fluid supply reservoir in said body separated from said bore by said wall; an intake port through the said wall for maintaining fluid communication between one of said reservoir compartments and said bore; a compensating port through said wall in spaced relation to said intake port, for normally interconnecting said bore with the other reservoir compartment; a tubular member closed at the same end as said bore and open at the other end to provide an inner cylinder characterized by an elongated cylindrical wall outwardly flanged at its forward end, and coaxially positioned within the forward portion of said bore in circularly spaced relation thereto to provide an annular outer cylinder therebetween; an annular fluid-displacement unit reciprocable in said outer cylinder from a normally retracted position; an annular pressure-working chamber in said outer cylinder normally defined by the fully retracted position of said fluid-displacement unit and the confronting inner face portion on the closed end of said longitudinal bore, said chamber having communication with the other reservoir compartment via said compensating port when said fluid-displacement unit is fully retracted; a reduced diameter extension defining the forward end portion of said tubular member; a discharge port through said bore wall communicating with said annular working chamber; a cylindrically chambered boss integral with said bore wall and projecting with an open end from the exterior thereof, said latter port being adapted to maintain fluid communication between said boss and annular working chambers; a threaded closure cap for the open end of said chambered boss; a central threaded bore through said cap; an hydraulic line fitting threaded into said central bore of the inner end of the threaded cap; a removable ring-like resilient valve seat contiguous to the said cap; a residual pressure check-valve having an annularly flanged end adapted to engage said valve seat to control minimal line pressure external to said boss and working chamber and accommodate discharge of pressurized fluid from said boss chamber into said connected line; a first normally preloaded compression spring operable in said chambered boss to react on the flanged end of said residual check-valve to control the same; a central aperture through the closed end of said longitudinal bore and through which said extension on the tubular member extends to the exterior thereof; a lock-nut adapted to engage an exposed threaded portion on said extension to stabilize said tubular member in coaxial overlapping relation with respect to the confronting portion of said longitudinal bore; a second normally preloaded compression spring operable in said working chamber to react between the flanged end of said residual pressure check-valve and said fluid-displacement unit to bias the latter toward fully retracted position and to control said check-valve; a circular fluid-displacement unit reciprocable in said inner cylinder from normally retracted position, as a unit with said first-named fluid-displacement unit in a fluid pressurizing direction; a circular working chamber defined by the circular fluid-displacement unit and confronting surface on the closed end of said inner cylinder; a discharge passage through said extension communicating with said last-named working chamber; a removable ring-like resilient valve seat contiguous to the inner marginal face of the inner end of said discharge passage; another residual pressure check-valve having an annularly flanged end adapted to engage said valve seat to control minimal line pressure external to said last-named working chamber, and accommodate discharge of pressurized fluid therefrom into the connected line; a third normally preloaded compression spring operable in said last-named working chamber to react between the flanged end of said other residual pressure check-valve and said circular fluid-displacement unit to bias the latter toward fully retracted position; a compensating channel indented in the inner surface of the wall of said inner cylinder adjacent its rear end to normally interconnect said last-named working chamber and one reservoir compartment via said intake port when said circular fluid-displacement unit is fully retracted; force-transmitting mechanical compensating means connecting said fluid-displacement units and a fluid-retaining actuator telescopically-related to one of said units and movable in unison with and relatively to both of said units, said compensating means including a plurality of normally positioned radially disposed lever elements having their extremes continuously engaging said units, respectively, and pivotally mounted intermediately on said actuator; and means for actuating said actuator and moving said displacement units in unison therewith via said lever elements in their normal positions when the fluid demand in both working chambers is substantially counterbalanced, said lever elements being rotatable out of their normal positions on their pivotal mountings to effect relative movement between said displacement units to compensate for fluid demand differential in their respective working chambers in response to relative movement of said actuator.

15. In a master cylinder having a body, a two-compartment fluid supply reservoir, a longitudinal bore substantially coextensive with said body, and a cylindrical wall closed at one end and open at the other defining said bore and bottom of said reservoir, the improvement which comprises: a cylindrically walled sleeve closed at one end and open at the other, and fixed at its closed end to the closed end of said bore to project into a portion of said bore in circularly spaced relation thereto, and thereby produce an inner cylinder within said sleeve and an outer annular cylinder with respect to said bore in coaxial overlapping relationship to the inner cylinder; an inner piston reciprocable in said inner cylinder; an outer piston reciprocable in said outer cylinder; an inner variable pressure-working chamber provided between said inner piston and closed end of said inner cylinder; an outer variable pressure-working chamber provided between said outer piston and closed end of said bore; a discharge port through the closed end of said inner cylinder communicating with said inner working chamber; another discharge port through the bore wall communicating with said outer working chamber; an intake port through said bore wall for maintaining fluid communication between one of the reservoir compartments and both pistons; a pair of compensating ports incorporated in the bore wall and sleeve wall, respectively, and normally open when the said pistons are fully retracted to place the two reservoir compartments in communication with said two working chambers, respectively; an annular constant volume static fluid chamber normally provided between a different portion of said bore and the outer piston; another annular constant volume static fluid chamber provided between said outer and inner pistons; a port through said outer piston interconnecting said annular fluid chambers; force-transmitting mechanical compensating means interconnecting said pistons with a coaxial fluid-retaining actuator defining one end of said two static fluid chambers and movable in unison with and relatively to both of said pistons, said compensating means including a plurality of normally positioned radially disposed lever elements having their extremes continuously engaging said pistons, respectively, and pivotally mounted with their intermediate portions in engagement with said actuator; and means for actuating said actuator and moving said pistons and lever elements as a unit when the fluid demand in both working chambers is substantially counterbalanced, said lever elements being rotatable on their pivotal mountings out of normal positions to effect relative movement between said pistons to compensate for fluid demand differential in their respective working chambers in response to relative movement of said actuator.

16. In a master cylinder having a body, a two-compartment fluid supply reservoir, a longitudinal bore substantially coextensive with said body, and a cylindrical wall closed at one end and open at the other defining said bore and bottom of said reservoir, the improvement which comprises: a cylindrically walled sleeve closed at one end and open at the other, and fixed at its closed end to the closed end of said bore to project into a portion of said bore in circularly spaced relation thereto, and thereby produce an inner cylinder within said sleeve and an outer annular cylinder with respect to said bore in coaxial overlapping relationship to the inner cylinder; an inner piston reciprocable in said inner cylinder; an outer piston reciprocable in said outer cylinder; an inner variable pressure-working chamber provided between said inner piston and closed end of said inner cylinder; an outer variable pressure-working chamber provided between said outer piston and closed end of said bore; a discharge port through the closed end of said inner cylinder for said inner working chamber; another discharge port through the bore wall of said outer cylinder for said outer working chamber; a pair of intake ports through the bore wall for maintaining fluid communication between said two reservoir compartments and both pistons, respectively; a pair of compensating ports incorporated in the walls of said bore and sleeve, respectively, and normally open when the said pistons are fully retracted, to place the two reservoir compartments in communication with the two working chambers, respectively; a fluid-retaining land axially spaced from the confronting ends of both pistons and adapted to slidably interfit a different portion of said bore in fluid sealed relation thereto to have unitary and relative movement with respect to said pistons; an annular fluid space provided between said outer piston and said fluid-retaining land; an annular partition wall intermediately disposed between said outer piston and fluid-retaining land to divide said annular fluid space into a pair of annular variable volume static fluid chambers adapted to communicate said pair of intake ports respectively; an annular constant volume static chamber provided between said outer and inner pistons; a port through a different portion of said outer piston for interconnecting said constant volume chamber with one of said variable volume static chambers; force-transmitting mechanical compensating means operably disposed in the axial space between said pistons and fluid-retaining land and adapted to interconnect said pistons with said last-named land, said compensating means including a plurality of normally positioned radially disposed lever elements having their extremes continuously engaging said pistons, respectively, and pivotally mounted with their intermediate portions in engagement with said retaining land; and means for sliding said retaining land, lever elements in their normal positions and said pistons as a unit when the fluid demand in both working chambers is substantially counterbalanced, said lever elements being rotatable on their pivotal mountings out of normal positions to effect relative sliding movement between said pistons to compensate for fluid demand differential in their respective working chambers in response to relative sliding movement of said fluid-retaining land.

17. In a combined dual master cylinder and a two-compartment fluid supply reservoir therefor: a pair of telescopically-related cylinders; a pair of pistons reciprocable in said cylinders, respectively; spring means for biasing said pistons toward fully retracted positions; a pair of compensating ports between said reservoir compartments and cylinders, respectively, said ports being normally open when said pistons are fully retracted; a pair of intake ports between said pistons and reservoir compartments, respectively; a fluid-retaining land slidably interfitting one of said cylinders and coaxially cooperable with both of said pistons to define a pair of concentrically-related annular fluid spaces; a partition wall fixed to said one cylinder between one of said pistons and said fluid-retaining land, for converting one of said annular fluid spaces into a pair of annular variable volume static fluid spaces which normally communicate with said pair of intake ports, respectively, with the other annular fluid space being continuously charged with a constant volume of static fluid; a passage between said other annular fluid space and one of said variable volume fluid spaces; force-transmitting mechanical compensating mechanism operatively incorporated between said pistons and fluid-retaining land and affording pivotal movement of said compensating means from normal position about a point fixed on said fluid-retaining land to effect relative movement of said pistons; and means for slidably moving said retaining land, the compensating means in normal position and said pistons as a unit when fluid demand in both cylinders is substantially counterbalanced, said compensating means being rotatable on said pivotal point out of normal position to effect relative sliding movement of said pistons to compensate for fluid demand differential in their respective cylinders in response to relative sliding movement of said fluid-retaining land.

18. In a combined dual master cylinder and a two-compartment fluid supply reservoir therefor: a pair of coaxial telescopically-related cylinders; a composite mechanical assembly comprising a pair of piston-like elements complemental to and slidable in said cylinders, respectively; a pair of variable pressure-working chambers in said cylinders, respectively, and activatable by said piston-like elements when moved from normally retracted position; a pair of discharge passages in communication with said working chambers, respectively; a pair of compensating ports between said reservoir compartments and said working chambers when said piston-like elements are fully retracted; a fluid-retaining land longitudinally spaced from and movable relatively to and as a unit with one of said piston-like elements in slidably interfitting relation to one of said cylinders; a pair of annular static fluid chambers disposed between one of said cylinders and the other piston-like element and between said piston-like elements, respectively; fluid passageway means adapted to maintain fluid communication between one of said reservoir compartments and one of said annular static chambers; a passage between said piston-like elements; springs means including a pair of normally preloaded spring operable in said working chambers, respectively, to bias said piston-like elements toward fully retracted positions; force-transmitting mechanical compensating mechanism operatively incorporated between said piston-like elements and fluid-retaining land and affording pivotal movement of said compensating means from normal position about a point fixed on said fluid-retaining land, to effect relative movement of said piston-like elements; and means for slidably moving said fluid-retaining land, the compensating means in normal position and said piston-like elements as a unit when fluid demand in both working chambers is substantially counterbalanced, said compensating means being rotatable on said pivotal point out of normal position to effect relative sliding movement of said piston-like elements to compensate for fluid demand differential in their respective working chambers in response to relative sliding movement of said fluid-retaining land.

19. In a dual-cylinder hydraulic actuator characterized by coaxial telescopic overlapping cylinders, a two-compartment fluid supply reservoir for said cylinders, respectively, separate lines from said cylinders connected to convey actuating fluid to operate the main clutch and brakes of a motor vehicle, a pair of pistons operable in said cylinders, respectively, for pressurizing the fluid in their respective working chambers therebetween, a pair of discharge ports for said working chambers, respectively, a pair of compensating ports interconnecting the two reservoir compartments with their respective working chambers when said pistons are fully retracted, a common intake port between one of said reservoir compartments and both of said pistons, said compensating ports being differently spaced ahead of their respective pistons for sequential closure thereby rendering their respective working chambers correspondingly operative, a one-way mechanical connection between said pistons enabling unitary movement thereof in a fluid-pressurizing direction, a pair of annular static fluid chambers between said pistons, a passage interconnecting said static fluid chambers, and an operator-operated member operable from a normally released position for operating said pistons as a unit to effect disengagement of the main clutch and operation of the brakes in that order.

20. In a dual-cylinder actuator characterized by coaxial telescopic overlapping cylinders, a two-compartment fluid supply reservoir, separate lines from said cylinders connected to convey actuating fluid under pressure to operate the main clutch and the brakes of a motor vehicle, a pair of pistons operable in said cylinders, respectively, for pressurizing the fluid in their respective working chambers therebetween, a pair of discharge ports for said working chambers, respectively, a pair of compensating ports interconnecting the two reservoir compartments with their respective working chambers when said pistons are fully retracted, said compensating ports being differently spaced ahead of their respective pistons when fully retracted for sequential closure thereby rendering their respective working chambers correspondingly operative, a one-way mechanical connection between said pistons enabling unitary movement thereof in a fluid-pressurizing direction, a pair of concentric annular spaces containing static fluid between said pistons, a fixed partition wall between the annular outer space for dividing the same into a pair of annular static fluid chambers with said other static fluid space, a pair of intake ports between said reservoir compartments and said annular static fluid chambers, respectively, and an operator-operated member operable from a normally released position for operating said pistons as a unit to effect disengagement of the main clutch and operation of the brakes in that order.

21. A master cylinder constructed in accordance with claim 8 in which said annular partition wall is characterized by flexibility.

22. In a combined dual master cylinder and a two-compartment fluid supply reservoir therefor; a pair of telescopically-related cylinders having separate pressure outlets, respectively; a fluid-pressurizing piston reciprocable in each cylinder; spring means for biasing said pistons toward fully retracted position; a pair of compensating ports between said reservoir compartments and cylinders, respectively, said ports being normally open when said pistons are fully retracted; a pair of intake ports between said pistons and reservoir compartments, respectively; a fluid-retaining piston slidably interfitting one of said cylinders and coaxially cooperable with said pressurizing pistons to define a pair of concentrically-related annular fluid spaces; a partition wall between one of said pressurizing pistons and said fluid-retaining piston, for converting one of said annular fluid spaces into a pair of annular variable volume static fluid spaces having continuous fluid communication with said pair of intake ports, respectively; a fluid passage between one of said variable volume fluid spaces and the other annular fluid space, for maintaining the latter filled with reservoir fluid; mechanical fluid compensating mechanism operatively incorporated between said fluid-retaining piston and said pressurizing pistons, for transmitting actuating force to said pressurizing pistons, said mechanism being adapted to effect relative movement between said pressurizing pistons to compensate for fluid demand differential in said cylinders in response to relative sliding movement of said fluid-retaining piston; and operatable means for sliding said fluid-retaining piston.

23. In a dual master cylinder having a chamber-defining body processed with a two-compartment fluid supply reservoir, a longitudinal bore substantially coextensive with said body, a cylindrical wall adapted to close one end of said bore and to form the bottom of said reservoir compartments, a cylindrically walled sleeve projecting from the closed end of said bore in circularly spaced relationship with respect thereto, to produce an inner cylinder within said sleeve and an outer annular cylinder between said sleeve and bore wall in concentric overlapping relationship, an inner fluid-pressurizing piston reciprocable in said inner cylinder from a fully retracted position, an outer fluid-pressurizing piston reciprocable in said outer cylinder from a fully retracted position, the improvement which comprises: separate pressure outlets for said cylinders, respectively; a partition wall between the rear portion of said outer piston and said bore wall; a variable volume static fluid chamber on one side of said partition; another variable volume static fluid chamber on the other side of said partition; a constant volume static fluid chamber between the rear portions of said pistons; a fluid passage incorporated in the rear portion of said outer piston for maintaining fluid communication between said other variable volume chamber and said constant volume chamber; separate compensating incorporated in the said sleeve wall and said bore wall, respectively, said ports being normally open to establish fluid communication between said cylinders and respective reservoir compartments when said pistons are fully retracted; separate intake ports incorporated in said bore wall to maintain fluid communication between said reservoir compartments and said variable volume chambers, respectively; mechanical fluid compensating mechanism including a plurality of circumferentially spaced radially disposed balancing levers having their extremes in engagement with the rear ends of said pistons, respectively, an actuator common to both pistons, a like-number of struts fixed at one end to said actuator in radial alignment with said balancing levers, respectively, and adapted to provide pivotal mounting for the intermediate portions of said balancing levers, an outturned arcuate portion defining the free ends of said struts, and which project into said constant volume chamber between the rear portions of said pistons to serve as a bearing support for the latter; and means for actuating said actuator to move both pistons and balancing levers as a unit when the fluid demand in both cylinders is substantially counterbalanced, said balancing levers being rotatable on their pivotal mountings to effect relative movement of said pistons to compensate for fluid demand differential in their respective cylinders, in response to relative actuation of said actuator.

24. A dual master cylinder constructed in accordance with claim 23 in which each of said struts comprises: a rectangular plate having one end fixed to said actuator with opposite edges thereof normal to said fixed end offset to produce an elongated extension projecting from the other end of said plate, an outturned flange terminating said extension and which projects into said constant volume chamber between said pistons, an arcuate surface defining the end of said flange, and which is complemental to the inner cylindrical surface of said outer piston to slidably support the latter, and a pair of aligned fulcrum surfaces defined by said edge offset.

25. A dual master cylinder constructed in accordance with claim 24 in which each of said balancing levers comprises: a rectangular plate having two of its opposite edges offset toward said pistons, respectively, in engagement therewith, and normally disposed perpendicular to the axis of said actuator, and a central aperture in said lever through which said extension loosely passes to support said lever in operating position with respect to said fulcrum surfaces, whereby rotation of said lever on its fulcrum surfaces displaces said pistons relatively to each other to effect compensation for fluid demand differential aforesaid in said cylinders.

26. A dual master cylinder constructed in accordance with claim 25 including a pair of radially spaced abutments on said actuator in alignment with said balancing lever for engagement thereby to limit the compensating movement of said lever in either direction of rotation from its normal perpendicular position.

References Cited by the Examiner
UNITED STATES PATENTS

| | | | |
|---|---|---|---|
| 1,919,465 | 7/33 | Furgason | 188—152.10 X |
| 2,074,416 | 3/37 | Oliver | 60—54.5 |
| 3,021,677 | 2/62 | Miller | 60—54.6 |

SAMUEL LEVINE, *Primary Examiner.*

EDGAR W. GEOGHEGAN, JULIUS E. WEST,
*Examiners.*